MAGNETIC AMPLIFIER FREQUENCY RESPONSE IMPROVEMENT

Filed March 11, 1957 4 Sheets-Sheet 1

INVENTORS
HENRY F. McKENNEY
GAETANO T. AMATO

BY Victor D. Borst
ATTORNEY

April 12, 1960 H. F. McKENNEY ET AL 2,932,788

MAGNETIC AMPLIFIER FREQUENCY RESPONSE IMPROVEMENT

Filed March 11, 1957 4 Sheets-Sheet 3

INVENTORS
HENRY F. McKENNEY
GAETANO T. AMATO

BY Victor D. Borst
ATTORNEY

INVENTORS
HENRY F. McKENNEY
GAETANO T. AMATO
BY Victor D. Borst
ATTORNEY

United States Patent Office 2,932,788

Patented Apr. 12, 1960

2,932,788

MAGNETIC AMPLIFIER FREQUENCY RESPONSE IMPROVEMENT

Henry F. McKenney, Weston, Mass., and Gaetano T. Amato, Bronx, N.Y., assignors to Sperry Rand Corporation, Ford Instrument Company Division, Long Island City, N.Y., a corporation of Delaware Application March 11, 1957, Serial No. 645,121

3 Claims. (Cl. 323—89)

This invention relates to magnetic amplifier systems and more particularly to a magnetic amplifier having phase control means for reducing the lapsed time between the response signal in the output of a half-wave bridge type magnetic amplifier and the originating signal applied to its input circuit.

The basic half-wave bridge type magnetic amplifier is frequently used for servo control systems requiring a rapid response in the amplifier output to input signals. This type of magnetic amplifier is characterized by a bridge network for each stage comprising two reactors connected in parallel across the line in series with similarly poled half-wave rectifiers so that they are both pulsed by the same half-wave of the line voltage. Each reactor has two anode windings and each anode winding is connected in series with the anode winding of the other reactor. The control current which governs the saturation of the reactor magnetic circuits of the first stage acts differentially with respect to the reactor windings to effect a differential flux preconditioning of the two magnetic paths on the off half-cycle of the reactance winding. Each control winding after the first stage is connected to the output of the preceding stage which appears across the branch circuits between the two reactor windings.

The bridge type magnetic amplifier stage has two distinct operations occuring during every cycle of the supply voltage. The first half-cycle is generaly referred to as the flux-setting half-cycle, and the second half-cycle is referred to as the conducting half-cycle. When two amplifier stages are cascaded in the usual manner, the conduction half-cycle of the first stage occurs during the flux-setting half-cycle of the second stage. In a unit with two stages of amplification each driven from a common source of supply, the conduction currents are approximately 180° out of phase and occur on alternate half-cycles. This represents a time response lag of a half-cycle from one stage of amplification to the next. Since the initial input to the first stage can occur during the conduction half-cycle, a response time lag is encountered of from one-half-cycle to one cycle. When two stages are cascaded, the response time lag can vary from one to one and a half-cycles.

The response time lag can be reduced by altering the phase relationship between the input currents for the first and second stages, relative to the anode voltages applied to the amplifier bridge networks. Neglecting the effect of biasing so that conduction will occur for full half-cycles, a vector analysis indicates that the inherent time lag can be decreased by ¼ cycle when the current of the first stage leads by 45° and the current of the second stage lags by 45°, the phase relationship being relative to the signal phase which is assumed to be in phase with the line voltage. Additional reductions in the time lag can be achieved by reorienting the rectifiers of the second stage.

In general the invention contemplates a servo mechanism control system comprising a two stage half-wave bridge type magnetic amplifier energized by a single phase line, a servo motor connected to the output of the magnetic amplifier, a response potentiometer driven by the servo motor, a signal potentiometer connected in series with the response potentiometer, and a phase shifting network connected between the single phase line and the potentiometers.

The differential error signal occuring between the contact points of the response and signal potentiometers is applied to the input control circuit of the two stage bridge type magnetic amplifier. With the introduction of the phase shifting network to alter the phase of the input error signal current relative to the anode voltages, the response time lag of the system is thereby reduced. In a three-phase embodiment of the invention, one of the three phase supply voltages is impressed across the potentiometers to supply the voltage potential for the error signal, the 120° leading phase is phase reversed by a transformer and applied to the bridge network of the first stage while the 120° lagging phase is applied to the bridge network of the second stage. Assuming no reactance in the circuits, the phase of the input error signal current leads the voltage applied to the first stage by 60° and the second stage input current leads the applied voltage to the second stage by 60°.

The features of the invention will be understood more clearly from the following detailed description taken in conjunction with the accompanying drawings, in which.

Figure 1:
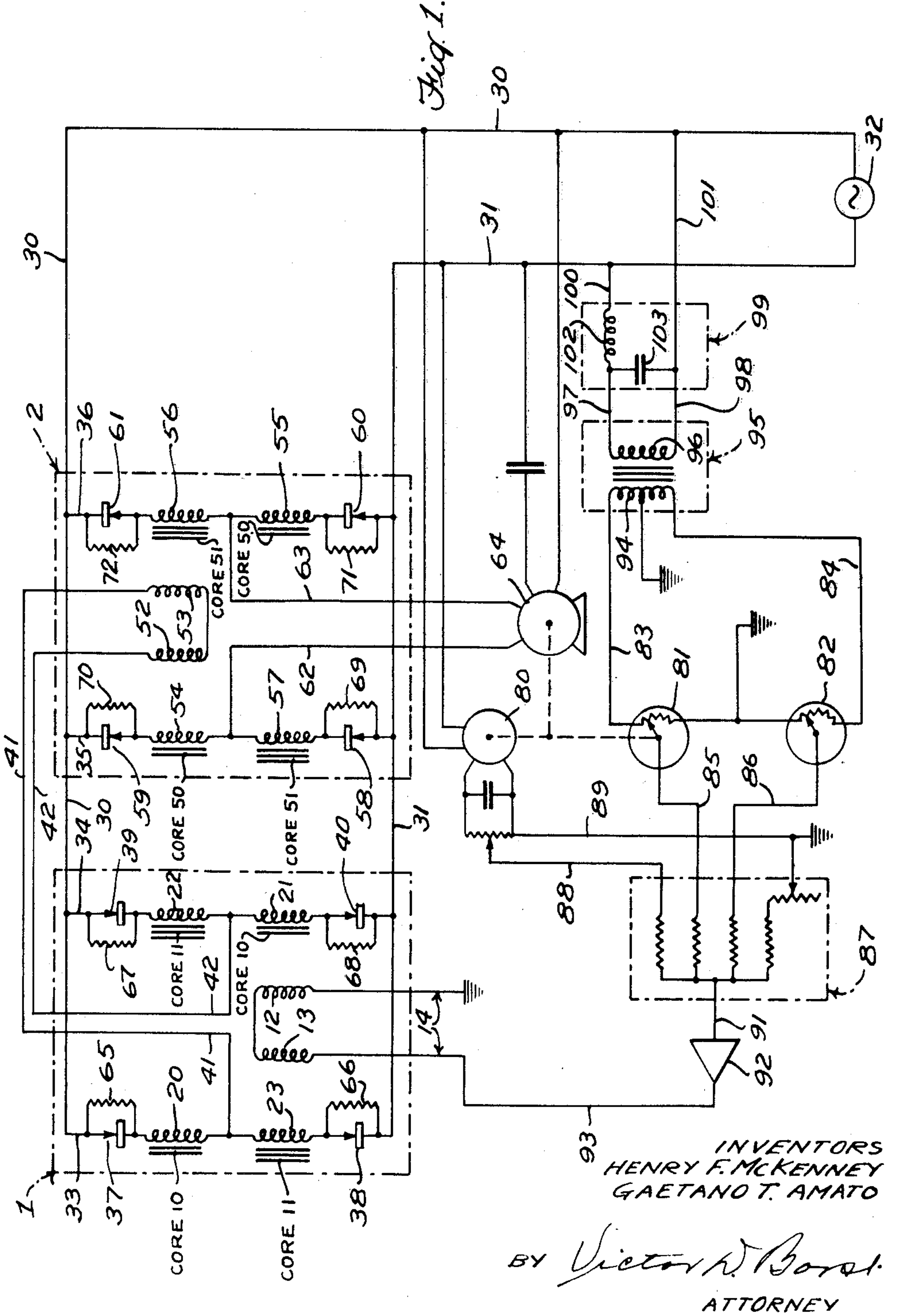
Fig. 1 is a schematic diagram of a single phase embodiment of a two stage rapid response half-wave bridge amplifier in a servo system.

Referring to Fig. 1, there are provided two saturable reactor bridge networks 1 and 2 for the illustrated two stage amplifier. Bridge network 1 includes two closed saturable magnetic ring cores 10 and 11 on which respectively are disposed oppositely wound control windings 12 and 13. A control signal circuit 14 includes a series connection of the winding 12 and the winding 13.

Disposed on the ring cores 10 and 11 are reactor windings 20 and 21 and reactor windings 22 and 23, respectively. Connected to a single phase alternating current lines 30 and 31, which receives energization from an alternating supply generator 32, are four branch circuits 33, 34, 35 and 36. Branch circuit 33 comprises a series circuit of a half-wave rectifier 37 poled away from the line 30, the winding 20, the winding 23 and a half-wave rectifier 38 poled toward the line 31. Branch circuit 34 comprises a series circuit of a half-wave rectifier 39 poled away from the line 30, the winding 22, the winding 21 and a half-wave rectifier 40 poled toward the line 31. The output of the first amplifier stage appears between conductors 41 and 42 which are connected respectively to the junction points between the reactor windings of the bridge network 1. Bridge network 2 includes two closed saturable magnetic ring cores 50 and 51 on which respectively are disposed oppositely wound control windings 52 and 53. An input circuit to the bridge network 2 comprises in series the windings 52 and 53 and the conductors 41 and 42. Disposed on the ring cores 50 and 51 are reactor windings 54 and 55 and reactor windings 56 and 57 respectively. Branch circuit 35 comprises a series circuit of a half-wave rectifier 58 poled away from the line 31, the winding 57, the winding 54 and a half-wave rectifier 59 poled toward the line 30. Branch circuit 36 comprises a series circuit of a half-wave rectifier 60 poled away from the line 31, the winding 55, the winding 56 and a half-wave rectifier 61 poled toward the line 30. The output voltage of bridge network 2 appears across conductors 62 and 63 which are connected respectively to the junction points between the reactor windings. The output circuit is terminated in the control winding of a two phase servo motor 64. The two reactor windings on each of the cores 10, 11, 50 and 51 are wound and sensed to induce similarly directed fluxes in the individual cores.

The half-wave rectifiers disposed in each branch circuit and those for each stage are poled in the same direction so that both reactor windings utilize the same half-cycle of the alternating supply voltage. For alternating stages these rectifiers are poled in opposite directions so that alternate stages use alternate half-cycles. Resistors 65, 66, 67, 68, 69, 70, 71 and 72 of selected values in shunt with the half-wave rectifiers 37, 38, 39, 40, 58, 59, 60 and 61, respectively may be used to control the back current on the off half-cycle and so serve as biasing resistors to set the operating point on the hysteresis curve to the desired quiescent level. Obviously, auxiliary bias windings may also be used to accomplish the desired biasing as stated above. The control windings in each stage are connected in a series opposition circuit and have push-pull relationship to the four reactor windings on each stage. A control signal current during the off half-cycle of supply alternating voltage will precondition the stage of magnetism in two associated reactor cores relative to the quiescent level.

The signal current input to circuit 14 is the error current of the typical servo control system shown in schematic in Fig. 1. This system includes a rate generator 80 and a response potentiometer 81 mechanically driven by the servo motor 64. In series connection with the response potentiometer 81 is a signal potentiometer 82, the junction being connected to ground potential and these potentiometers are connected across conductors 83 and 84 which are energized by an alternating voltage. The differential electrical voltage appearing across the contact points of the potentiometers 81 and 82 is the error signal and conductors 85 and 86 connect these contact points to a resistance box 87. The output of the rate generator 80 is connected to two other input terminals of the resistance box 87 by conductors 88 and 89, the latter conductor being connected to a ground potential. The ungrounded output lead 91 of the resistor box 87 is connected to the ungrounded input terminal of an electronic amplifier 92 having one input and one output terminal connected to ground potential. The ungrounded output terminal of the electronic amplifier 92 is connected by conductor 93 to one conductor of the input circuit 14 of the half-wave bridge type magnetic amplifier, the other conductor of the input circuit 14 is grounded. The phase of the error signal current in the input circuit 14 relative to the line potential applied to bridge networks 1 and 2 is dependent on the phase of the potential across conductors 83 and 84 relative to the same line potential. These conductors are connected across a center tapped output winding 94 of a reference transformer 95, the center tap being connected to ground potential. The input winding 96 of reference transformer 95 is connected to an impedance network 99 by conductors 97 and 98. The input of the impedance network 99 is connected to the alternating supply generator 32 by conductors 100 and 101. The impedance network 99 comprises any conventional arrangement of impedances and as shown may be an L network including an inductor 102 and a capacitor 103 having selected values to alter the phase of the voltage across conductors 83 and 84. Consequently the phase of the error signal current in circuit 14 relative to the line or anode voltage appearing across conductor 30 and 31 may be adjusted as required.

Figure 2:
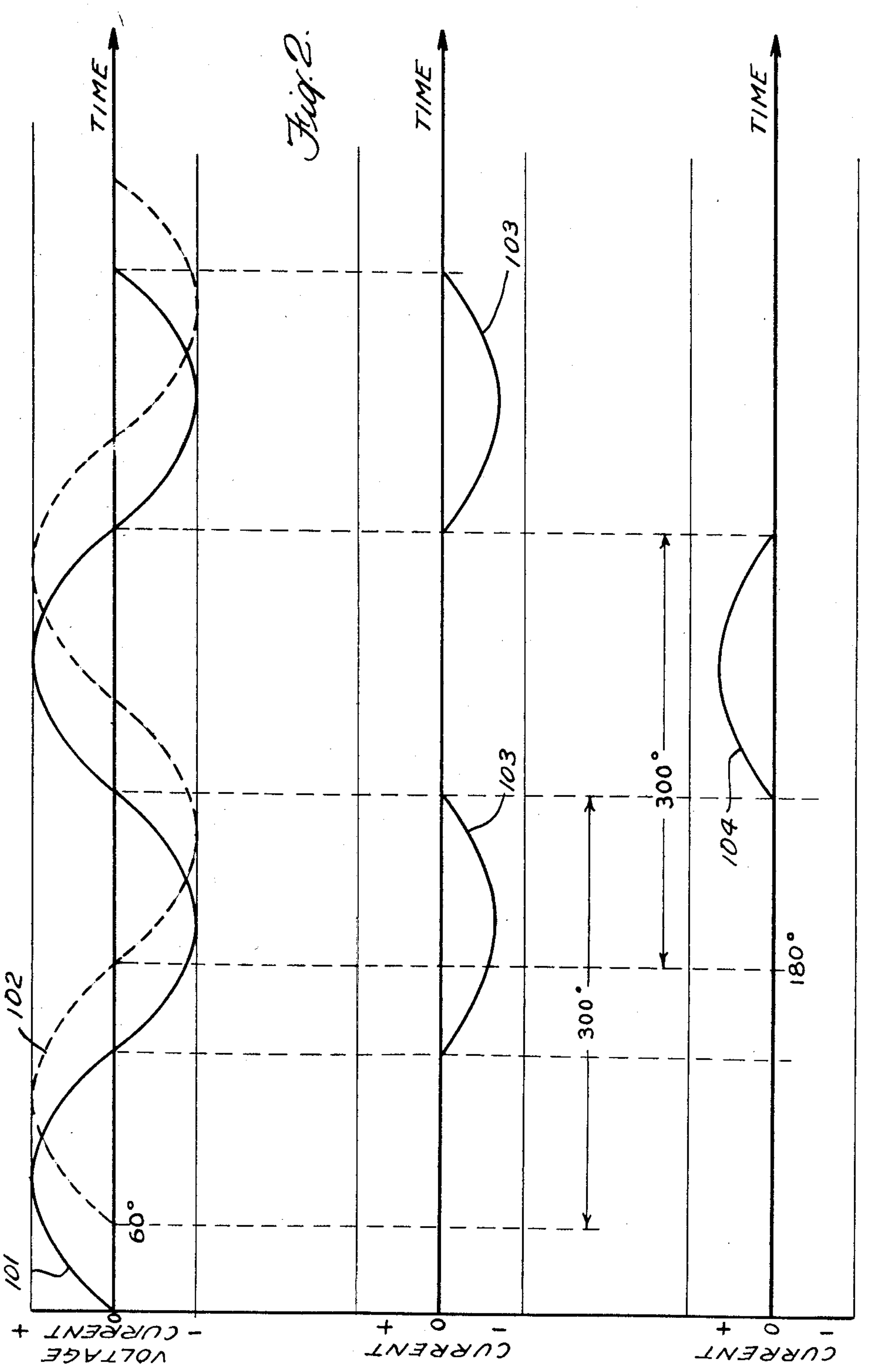
Fig. 2 is a diagrammatic representation of the phase of the currents associated with the input signal and stages of the magnetic amplifier of Fig. 1.

Fig. 2 diagrammatically illustrates the improvement in the response lag time when impedance network 99 effects a 60° lag in the signal current in circuit 14 relative to the anode voltage across conductors 30 and 31. In this figure, the anode line voltage applied to bridge network 1 is represented by sine curve 101 and the error signal current in the input circuit 14 is represented by curve 102. It is assumed that the initial signal occurs during the flux-setting half-cycle as otherwise an additional half-cycle response time lag would have to be introduced. Neglecting the effect of biasing so that conduction occurs for the full half-cycle, the input current to the second amplifier stage as carried by conductors 41 and 42 is represented by curve 103. The current output from the second amplifier stage as carried by conductors 62 and 63 to servo motor 64 is represented by curve 104. The improvement in response time for the two stage amplifier is ⅙ cycle.

Figure 3:
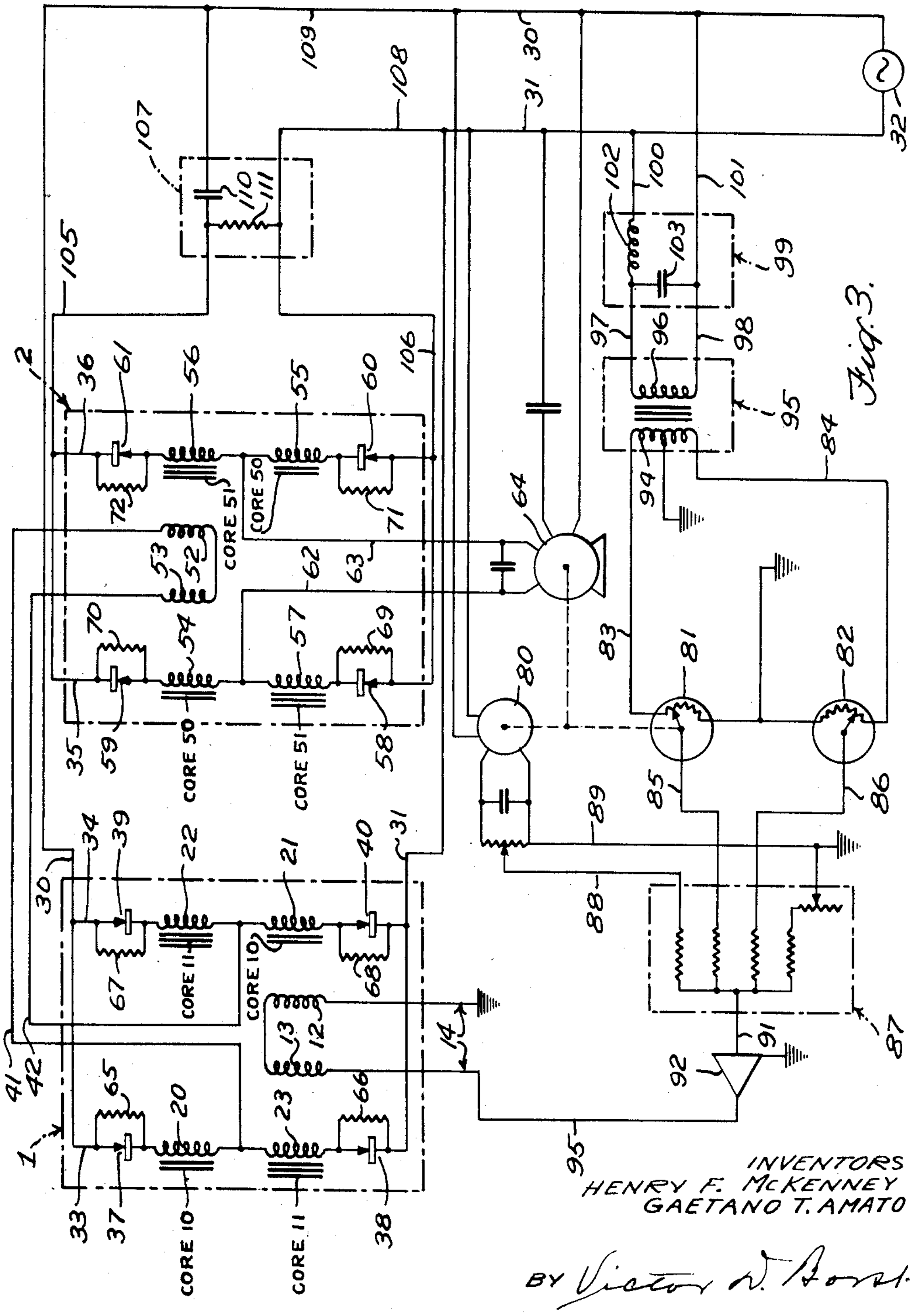
Fig. 3 is a modification of the device of Fig 1.

Fig. 3 is a modification of Fig. 1 employing a single phase voltage source wherein the phase of the voltage applied to bridge network 2 is different from that applied to bridge network 1. In order to simplify the understanding of the embodiment of the invention, like reference numbers are used to identify corresponding elements in all subsequent figures. In Fig. 3, the parallel branch circuits 35 and 36 of bridge network 2 are connected by alternating lines 105 and 106 to a second impedance network 107. The input to the impedance network 107 is connected to alternating lines 30 and 31 by conductors 108 and 109. The impedance network 107 comprises any conventional arrangements of impedance and is shown as an L network of a capacitor 110 and a resistor 111 having selected values to alter the phase of the voltage across lines 105 and 106 relative to the voltage appearing across lines 30 and 31.

Figure 4:
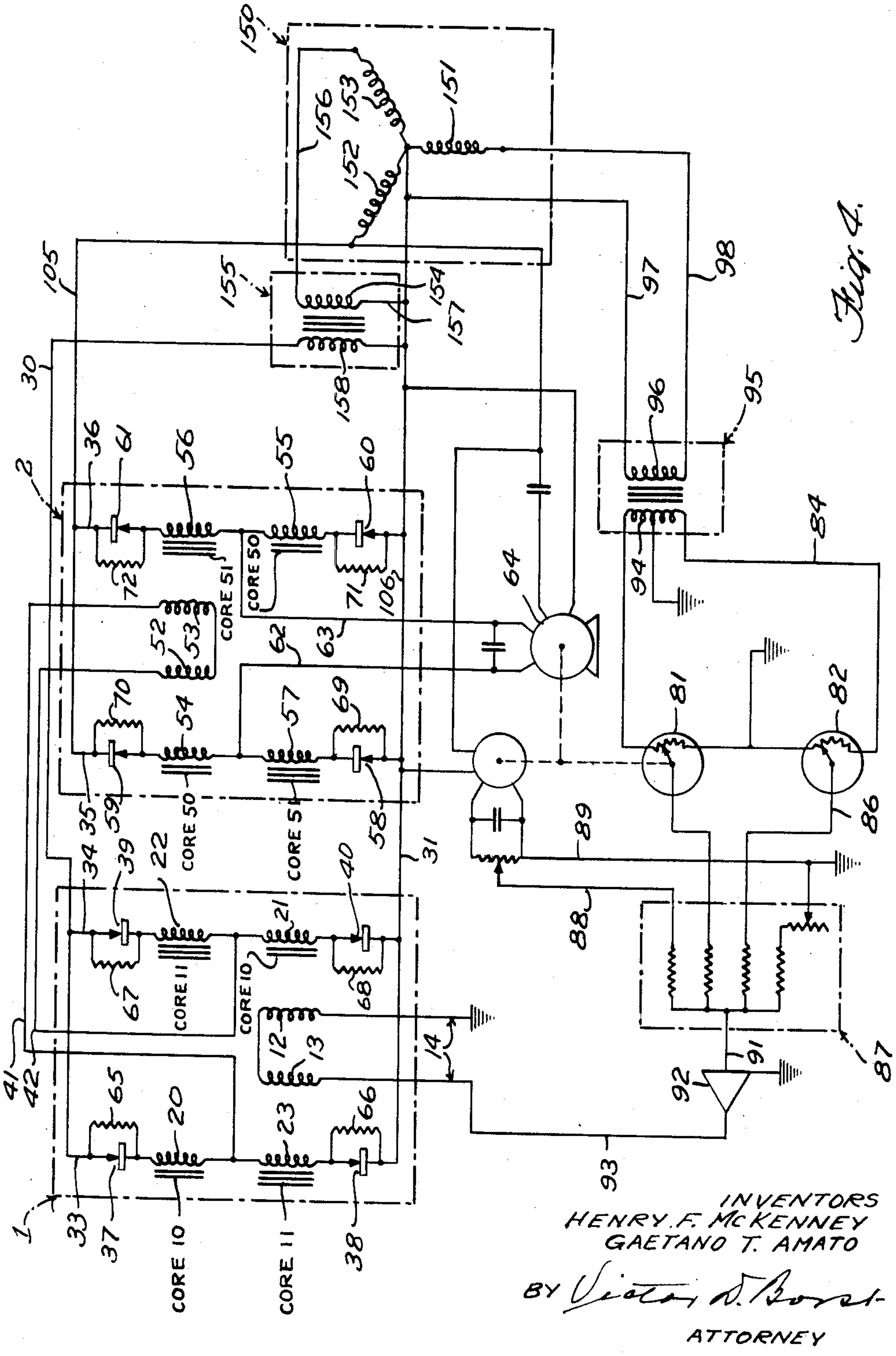
Fig. 4 is a schematic diagram of a three phase embodiment of a two stage rapid response half-wave bridge amplifier in a servo system.

Fig. 4 discloses an amplifier having a three-phase-Y voltage source 150 generating three voltages with consecutive phase separation of 120° in winding 151, 152 and 153, respectively for the voltage requirements of the component parts of the servo control system of Fig. 3. One of each of these voltages is applied to the input circuit 14, the bridge network 1 and the bridge network 2. It will be noted that the impedance networks 99 and 107 are omitted. The voltage winding 151 is connected directly to conductors 97 and 98 which energize reference transformer 95. The phase winding 152 is connected to conductors 105 and 106 which energize the bridge network 2. The phase winding 153 is connected across the input winding 154 of phase reversing transformer 155 by conductors 156 and 157. The output winding 158 of the transformer 155 is connected directly to conductors 30 and 31 which energize the bridge network 1. For the illustrated circuitry, the error signal current in input circuit 14 leads by 60 the anode voltage applied to bridge network 1 and the input current in conductors 41 and 42 to the second amplifier stage leads by 60 the anode voltage applied to the bridge network 2. The improvement in the response time for the two stage amplifier is approximately ½ cycle.

It is to be understood that various modifications of the invention other than those above described may be effected by persons skilled in the art without departing from the principle and scope of the inventions defined in the appended claims.

What is claimed is:

1. A two stage magnetic amplifier having an A.C. multi-phase voltage source, each stage comprising a pair of closed magnetic circuits, two reactor windings inductively disposed on each magnetic circuit, two branch circuits connected across said A.C. voltage source, each branch circuit including in series one reactor winding on one of said magnetic circuits being connected to one phase voltage output of said multi-phase voltage source and a second reactor winding on the other of said magnetic circuits, a control circuit including two control windings, one control winding disposed on each magnetic circuit, the two control windings in each stage being arranged in push-pull flux relationship with respect to the two magnetic circuits, means conductively connecting the control circuit of the second stage to the branch circuit of the first stage at points between the two windings in each branch circuit of said first stage, a signal source having the same frequency as the said A.C. voltage source, a phase shifting network connected to said signal source, circuit means connecting the control windings in the control circuit of the first stage to the phase shifting network, and two unidirectional conducting devices in each branch circuit, said devices being poled in the same direction in each stage and the devices for the second stage being oppositely poled to those of the first stage.

2. A two stage magnetic amplifier as claimed in claim 1, wherein said multi-phase voltage source provides a phase controlled signal source for the control circuit in the first stage, said signal source being in fixed and separate phase relationship to the other voltage phases of said multi phase A.C. voltage source.

3. A two stage magnetic amplifier as claimed in claim 2, wherein the phase of signal source voltage leads one voltage phase of said multi phase A.C. voltage source by 60° and leads the other voltage phase of said two phase A.C. voltage by 120°, the two voltages of said A.C. voltage source being phase displaced by 60°.

References Cited in the file of this patent

UNITED STATES PATENTS

| | | |
|---|---|---|
| 2,768,345 | Ogle et al. | Oct. 23, 1956 |
| 2,792,547 | Horton et al. | May 14, 1957 |

OTHER REFERENCES

Publication: Magnetic Amplifier Circuits, by W. A. Geyger; McGraw-Hill Book Co., Inc., New York, 1954; first edition, pages 179–182.